Patented Oct. 24, 1933

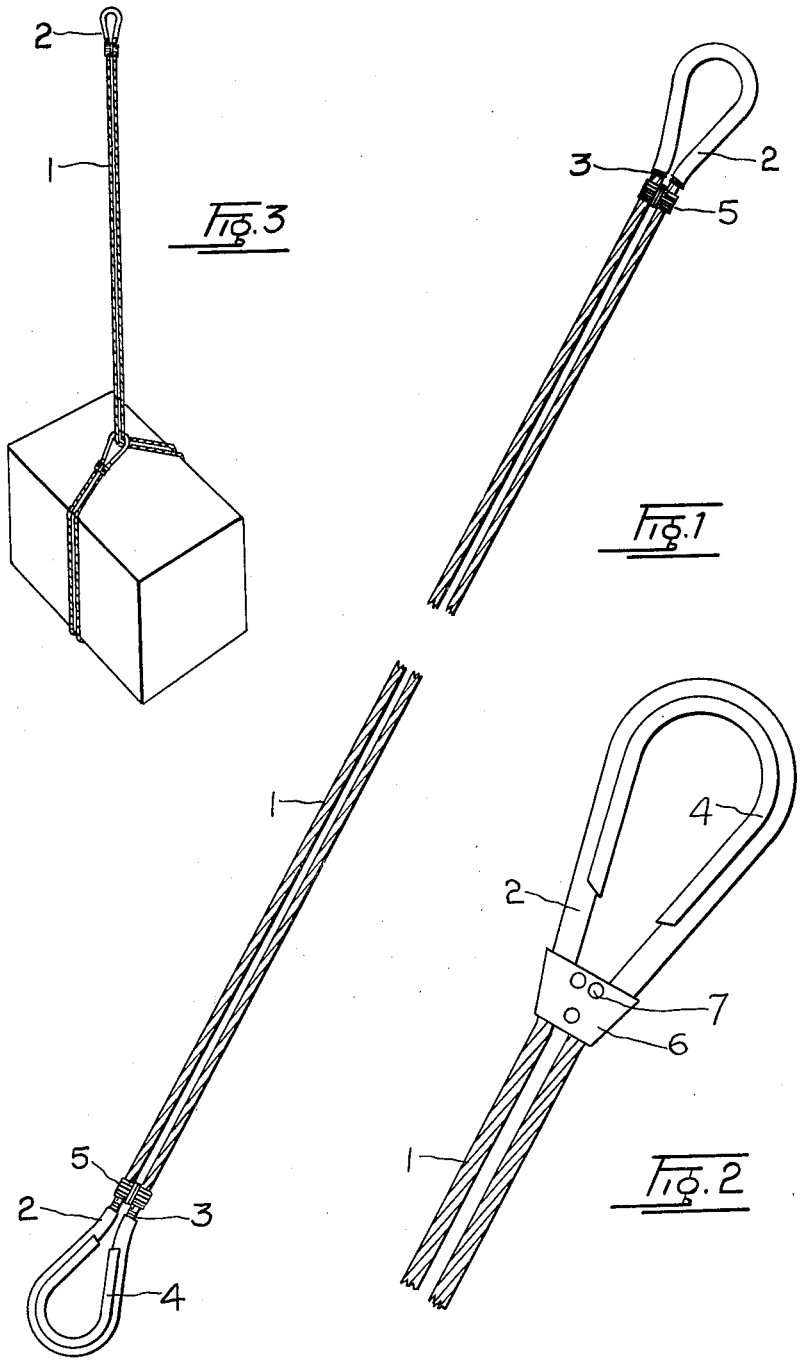

1,931,808

UNITED STATES PATENT OFFICE 1,931,808

ROPE SLING

Hans Andersen, Vancouver, British Columbia, Canada

Application October 12, 1932, Serial No. 637,463, and in Canada November 24, 1931

3 Claims. (Cl. 24—17)

My invention relates to improvements in rope slings, the objects of which are to provide a sling of the endless type having a breaking strain substantially equal to that of two ropes of equivalent size and to provide a sling which will tighten about its load by the weight of the load alone thereby avoiding the necessity of driving the lower loop along the sling towards the load as is invariably done in slings of the ordinary type.

The invention consists essentially of an endless rope passing at opposite points through pipe loops and secured therein against easy sliding movement, as will be more fully described in the following specification and shown in the accompanying drawing, in which:—

Fig. 1 is a general view of the invention.

Fig. 2 is a detail view showing a modification.

Fig. 3 is a general view of the sling in use.

In the drawing like characters of reference indicate corresponding parts in each figure.

The numeral 1 indicates generaly a sling of wire, manila or other rope, which is preferably formed by taking a single strand of sufficient length to make the entire sling and to allow for a so-called "closing splice" being made between its ends at the completion of the rope.

In making the sling a pair of pipe loops 2 bent substantially in the form of a horseshoe are laid out at a suitable distance apart and the strand of the rope is passed through both loops, brought back on itself, temporarily joined together, and the remaining or free portion of the strand is twisted about it in the usual manner of making an endless rope or grommet.

It will be obvious that the strand is threaded through the loops from time to time as the formation of the rope takes place, the closing splice of the final strand laid is enclosed in one of the pipe loops. When the rope is completely formed, the two opposing ends are connected together by a closing splice in the well known manner, thus leaving an endess rope without enlargement at any point, such as results from an ordinary splice, on which endless rope the pipe loops are fitted. The rope is then seized at opposing points as at 3 with tarred marline or other suitable binding material and the seized portions are drawn into the pipe loops 2. The rope with its seizing 3 is of a slightly greater diameter than the bore of the pipe loops so as to provide a positive grip between them.

Where heavy strains and wear are to be encountered I strengthen the pipe loops on the inside with a thimble 4 of the usual type, which is held in position by braising or other appropriate means.

When the rope is completely formed and the pipe loops are set in proper position, I bind the parallel portions thereof together with a seizing as at 5, this seizing being placed sufficiently remote from the bight of the adjacent pipe loop to permit of the passage of the opposite pipe loop therethrough.

As an alternative to the rope seizing and in cases where the sling is to be subjected to excessive wear, I prefer for use a clamp 6, see Figure 2, which would be made up in two halves in the usual manner and secured together about the rope with rivets or bolts 7.

When the sling is used in the manner shown in Figure 3 for hoisting one or more articles, the sling is passed under the load and the ends brought upwards passing one loop through the other and attaching the first named loop to the hook of the hoisting gear. As the strain of the load is imposed upon the sling the lower pipe loop will commence to slide downwards along the rope and will continue to do so quite freely until the load is properly choked. This free sliding movement is obtained through the use of a rope free from loose or projecting strands and by virtue of the relatively large rounded surface of the pipe loop engaging the rope.

It has been found on test that the sling thus constructed has a breaking strain equal to twice the breaking strain of the rope from which it is made.

What I claim as my invention is:

1. A rope sling comprising a tubular loop member open only at the ends, a strand extending progressively through said loop and being twisted about itself to form a rope substantially filling the tubular loop.

2. A rope sling comprising a tubular loop member open only at the ends, a strand extending progressively through said loop and being twisted about itself to form a rope, the portion of the rope within the tube being seized to bind it within the tubular member against endwise movement.

3. A rope sling comprising a tubular loop member open only at the ends, a strand extending progressively through said loop and being twisted about itself to form a rope and forming a closing splice within the tubular member.

HANS ANDERSEN.